United States Patent

Muryoi

[15] 3,672,287
[45] June 27, 1972

[54] SHIFTABLE OBJECTIVE LENS

[72] Inventor: Takeshi Muryoi, Yokohama-shi, Japan

[73] Assignee: Nippon Kogaku K.K., Tokyo, Japan

[22] Filed: Dec. 16, 1969

[21] Appl. No.: 885,510

[30] Foreign Application Priority Data

Dec. 25, 1968 Japan.....................................43/94479
Dec. 25, 1968 Japan.....................................43/94481
Dec. 25, 1968 Japan.....................................43/94482

[52] U.S. Cl. .......................................95/64 R, 95/42, 95/51
[51] Int. Cl. .........................................G03b 5/02, G03b 9/02
[58] Field of Search.........................95/10 C, 42, 50, 51, 64 R

[56] References Cited

UNITED STATES PATENTS 3,060,825   10/1962   Bentzman..................................95/51

Primary Examiner—Joseph F. Peters, Jr.
Attorney—Ward, McElhannon, Brooks & Fitzpatrick

[57] ABSTRACT

An objective lens interlocking with an exposure meter and a shutter in a camera wherein a parallel movement section including an objective lens system an aperture control ring, a diaphragm and an aperture adjusting cam member is arranged so as to move in unison in one predetermined direction in parallel with the film plane; and a rotation transmitting link mechanism is disposed between said parallel movement section and a stationary section with an aperture setting member of the objective lens so that the rotation of an aperture ring interlocked with exposure meter through an exposure meter coupling member on the aperture setting member may be transmitted to the exposure meter in all of the shifting direction. And the aperture control ring is interlocked with an automatic aperture controlling device of the camera.

2 Claims, 6 Drawing Figures

SHIFTABLE OBJECTIVE LENS

The present invention relates to a shiftable objective lens interlocking with an exposure meter and a shutter in a camera.

In conventional cameras with a shiftable objective lens, upon shifting, both the diaphragm and the objective lens system are displaced so that it is very difficult to provide an interlocking system between the exposure meter in the camera body and the diaphragm. It is further difficult to provide in such a camera both an exposure meter interlocking system and an automatic aperture or exposure control device.

In view of the above, the primary object of the present invention is to provide an exposure meter interlocking system simple in construction for panoramic cameras so that even when the diaphragm is displaced, exposure meter interlocking and exposure control may be effected.

Another object of the present invention is provision of means whereby exposure meter interlocking and automatic preset diaphragm control may be effected for cameras with a shiftable objective lens.

The present invention will be described more clearly referring to the illustrative embodiments shown in the attached drawings, in which.

Figure 1:
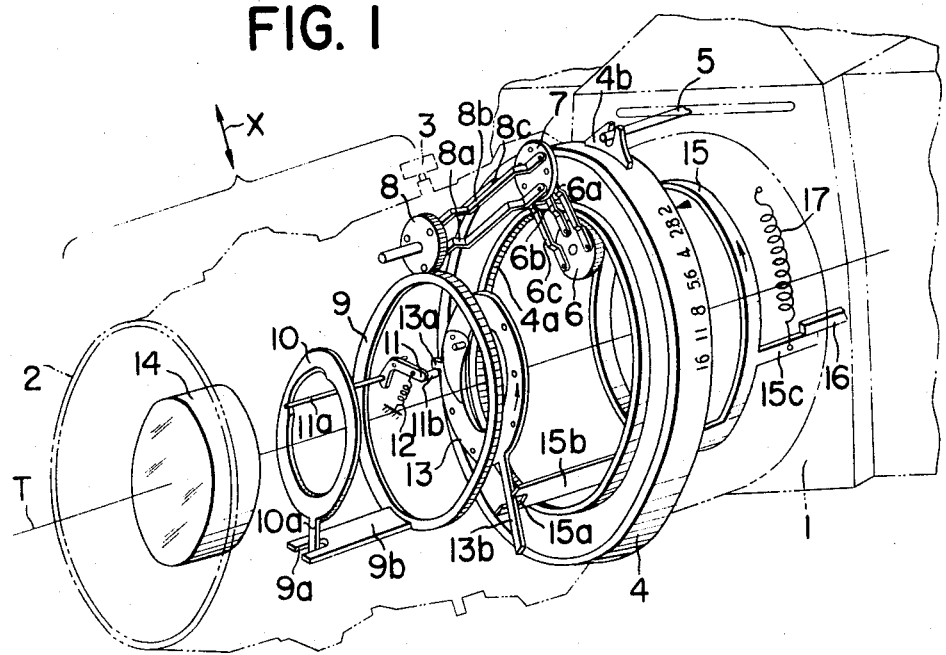
FIG. 1 is a perspective view of a first embodiment of the present invention of the type for planning in one direction and automatic aperture control.

Referring to FIG. 1, a first embodiment of the present invention will be described. Reference numeral 1 designates a camera main body; 2, a lens barrel; and 3, a panoramic photographing operation knob (to be referred to as "shifting knob" hereinafter for brevity) for moving in a predetermined direction (indicated by the arrow X) the section including the parts from a toothed wheel 8 to an objective lens 14 in parallel with the film plane as will be described in more detail hereinafter. Reference numeral 4 denotes an aperture ring fitted over the lens barrel 2 for rotation about the optical axis T. The aperture ring 4 has internally toothed inner periphery 4a and an engaging projection or claw 4b extending from the outer periphery thereof for engagement with an actuating rod 5 which operates so as to vary the resistance of an exposure meter (not shown). Thus, the projection 4b and the actuating rod 5 constitute an exposure actuating mechanism so that rotation of the aperture ring 4 is interconnected with the exposure meter (not shown) whereby the exposure is suitably adjusted in response to variations of the aperture.

A toothed wheel 6 is rotatably attached to a stationary member of the lens barrel 2 and is in mesh with the internally toothed portion 4a of the aperture ring 4. One end of each of three links 6a, 6b and 6c are attached to the toothed wheel 6 while the other ends are rotatably attached to one surface of an idle disk 7. These links 6a, 6b and 6c are adapted to transmit the rotation of the toothed wheel 6 to the idle disk 7 upon rotation of the toothed wheel 6 without interferring with each other. A toothed wheel 8 is rotatably attached to the parallel movement member including the parts from an interlocking toothed wheel 9 to the objective lens 14 as will be described in more detail hereinafter. The toothed wheel 8 is in mesh with the interlocking toothed wheel 9. One end of each of links 8a, 8b and 8c are rotatably attached to the toothed wheel 8 while the other ends are rotatably attached to the other face of the idle disk 7. These links 8a, 8b 8c are adapted to transmit the rotation of the idle disk 7 to the toothed wheel 8 without interferring with each other. Thus, the toothed wheel 6, the links 6a, 6b and 6c, the idle disk 7, the links 8a, 8b and 8c and the toothed wheel 8 constitute the rotation transmission link mechanism for transmitting the same angle of rotation of the aperture ring 4 to the interlocking toothed wheel 9 even if the parallel movement member to be described in more detail hereinafter makes an arbitrary parallel movement.

The interlocking toothed wheel 9 is attached to the lens barrel 2 for rotation about the optical axis T and has a connecting member 9b extending in parallel with the optical axis T and having a notch 9a. An aperture cam ring 10 is attached to the lens barrel 2 for rotation about the optical axis T and has a protrusion 10a extending into the notch 9a. A control or limit lever 11 has a connecting rod 11a extending from one end thereof for engagement with the cam ring 10. From the other end of the limit lever 11 extends a protrusion or stop pin 11b for engagement with an aperture control ring 13 to be described in more detail hereinafter. The center of the control or limit lever 11 is rotatably attached to the parallel movement member and the limit lever 11 is normally biased to rotate in the clockwise direction by means of a spring 12. Thus, the interlocking toothed wheel 9, the aperture cam ring 10, the limit lever 11, etc. constitute the aperture setting mechanism so that when the aperture ring 4 is rotated to a desired aperture value, the limit lever 11 is set to a predetermined position through said link mechanism 6 to 8, thereby controlling or limiting the rotation of the aperture control ring 13. The aperture control ring 13 that actuates the diaphragm is disposed in the lens barrel 2 for rotation about the optical axis T and has a protrusion 13a for engagement with the stop pin 11b and a connecting member 13b extending in the shifting direction. The aperture control ring 13 constitutes a diaphragm actuating or setting member for setting the diaphragm to form a desired aperture set by said aperture setting mechanism through an aperture interlocking member 16 and an aperture interlocking ring 15 to be described in more detail hereinafter.

The parts from the toothed wheel 8 to the objective lens 14 constitute the parallel movement member or section which makes a parallel movement relative to the optical axis T in a predetermined direction (indicated by the arrow X). The aperture or diaphragm interlocking ring 15 has an actuating member 15b having a notch 15a adapted to engage with the connecting member 13b of the aperture control ring 13 and an interlocking extension 15c for engagement with a diaphragm actuating lever 16 interlocked with a shutter release button (not shown). The aperture interlocking ring 15 is normally biased by means of a spring 17 to rotate in the counterclockwise direction. The connecting member 13b is adapted to slide in the notch 15a while retaining the engagement therewith when the parallel movement section makes its parallel movement.

When the shutter release button (not shown) is depressed, the aperture control ring 13 rotates through an angle determined by the control or limit lever 11 through the aperture or diaphragm interlocking ring 15, its actuating member 15b and the connecting member 13b, so that the aperture blades may be actuated to provide a predetermined aperture.

Prior to the description of the mode of operation of the first embodiment, the rotation transmitting link mechanism will be further described in more detail hereinafter. As described hereinabove, two rotary disks 6 and 8 are interconnected through an intermediate disk 7 by several links which are arranged so as not to interfer with each other upon rotation of the rotary disks so that both of the rotary disks may be rotated in the same direction and through the same angle.

Figure 3:
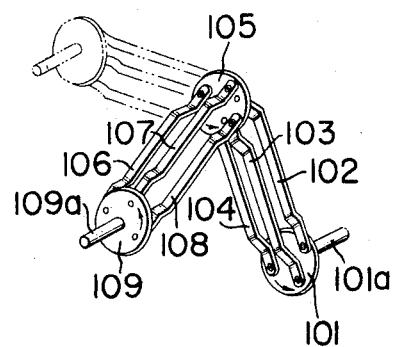
FIG. 3 is a perspective view of a rotation transmitting link mechanism.

FIG. 3 is a perspective view of one preferred embodiment of a rotation transmitting link mechanism according to the present invention. And wherein, a rotary disk 101 is shown carried by a rotary shaft 101a which rotatably journalled. One end of each of the links 102, 103 and 104 are pivotably attached to one surface of the rotary disk 101 while the other ends are rotatably attached to one surface of an intermediate or idle disk 105 so that these links 102, 103 and 104 may transmit the rotation of the rotary disk 101 to the intermediate disk 105 without interferring with each other. Another set of links 106, 107 and 108 are provided and one of each of the ends thereof are rotatably attached to the other surface of the intermediate disk 105 while the others are rotatably attached to one surface of a rotary disk 109 so that these links 106, 107 and 108 may transmit the rotation of the intermediate disk 105 to the rotary disk 109 without interference therebetween. The rotary disk 109 is carried by a rotary shaft 109a in parallel with both of the rotary disk 101 and the intermediate disk 105. The rotary shaft 109a is disposed for parallel movement relative to the rotary shaft 101a.

Figure 4:
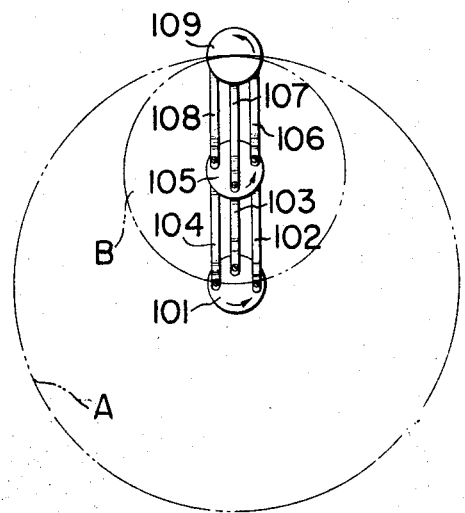
FIG. 4 is an elevation view of the parts shown in FIG. 3 in one selected position.

The rotation in the direction indicated by the arrow of the rotary disk 101 is transmitted to the intermediate rotary disk 105 so that the latter rotates in the direction indicated by its arrow through the same angle as that of the disk 101. In similar manner, rotation of the intermediate disk 105 is transmitted to the rotary disk 109 through the links 106, 107 and 108. Thus the rotation of the rotary shaft 101a can be transmitted to the rotary shaft 109a. Furthermore, as shown in FIG. 4 the rotary disk 109 can rotate about the axis of the rotary disk 101 as indicated by the two-dotted chain line A and can also rotate about the axis of the intermediate disk 105 as indicated by the chain line B. Thus, it is readily seen that the rotary disk 109 may move in parallel with the rotary disk 101 in any position within the circle indicated by the chain line A, while the rotary disk 109 may rotate in the same direction and through the same angle as the rotary disk 101. In this embodiment, three links are provided for interconnecting between the first rotary disk 101 and the intermediate rotary disk 105 and between the latter and the second rotary disk 109, but it is of course understood that more than two links may be used for connection. Furthermore, more than three rotary disks may be interconnected with each other in the similar manner as described above.

Thus, according to the rotary-transmitting link mechanism of the present invention, the rotation of the rotary disk having a fixed axis of rotation may be transmitted to the rotary disk whose rotary shaft moves in a plane perpendicular to the rotary shaft of the first mentioned rotary shaft in parallel therewith.

Next the mode of operation of the first embodiment of present invention will be described. Because of the construction described above, the parallel movement section including the parts from the toothed wheel 8 to the photo lens 14 may be moved in a predetermined direction (indicated by the arrow X) by the shifting knob 3 while the rotation of the aperture ring 4 is transmitted in the same direction and through the same angle of rotation to the interlocking toothed wheel 9 by the rotation transmitting link mechanism comprising the toothed wheel 6, the links 6a, 6b and 6c, the idle disk 7, the links 8a, 8b and 8c and the toothed wheel 8. Therefore when the aperture ring 4 is set to a desired aperture value for both paranomic and still photographing, the limit lever 11 is set to a predetermined position through the rotation transmitting link mechanism, the interlocking toothed wheel 9, and the aperture cam ring 10, so that the stop pin 11b is set to a predetermined position while the exposure meter (not shown) is actuated through the engagement of the engaging protrusion 4b with the actuating rod 5.

As described hereinbefore, when the parallel movement section moves, the connecting member 13b of the aperture control ring 13 slides through the notch 15a of the actuating member 15b while retaining the engagement therewith. Therefore, in both panoramic and still photographing, when the shutter button (not shown) is released the aperture or diaphragm setting ring 15 is caused to rotate in the direction indicated by the arrow by the spring 17 while the actuating member 15b engages with the connecting member 13b so that the aperture control ring 13 is caused to rotate in the direction indicated by the arrow. Then the rotation of aperture control ring 13 is limited when the engaging member 13a thereof engages with the stop pin 11b and the diaphragm is automatically set to a desired aperture value.

In this embodiment, the diaphragm setting member 16 is interlocked with the aperture control ring 13 through the diaphragm interlocking ring 15. However, the aperture control ring 13 may be normally biased to rotate in the direction at which the diaphragm may be set and directly interlocked with the diaphragm setting member 16. Furthermore, instead of the coupling member 13b extending in the panning direction, the connection member may be extended from the diaphragm interlocking ring 15 or the diaphragm setting member 16 in the shifting direction. The engaging relationship between the connecting member 13b and the notch 15a may be reversed.

In this embodiment, the interlocking toothed wheel 9, the aperture cam ring 10 and the control or limit lever 11 have been described as being incorporated in the aperture value setting mechanism while the aperture control ring 13 has been described as, in the diaphragm setting mechanism, but this arrangement may be reversed as needs demand. That is, the aperture control ring 13 may be incorporated in the aperture value setting mechanism while the interlocking toothed wheel 9, the aperture cam ring 10 and the limit lever 11, may be incorporated in the diaphragm setting mechanism. Furthermore, the aperture ring 4 having graduated scales may be used as a component or part constituting the exposure meter actuating mechanism. However, for example, the aperture ring 4 may be replaced with an interlocking ring having no graduated scales while the aperture ring having graduated scales may be attached to the interlocking toothed wheel 9.

Figure 2:
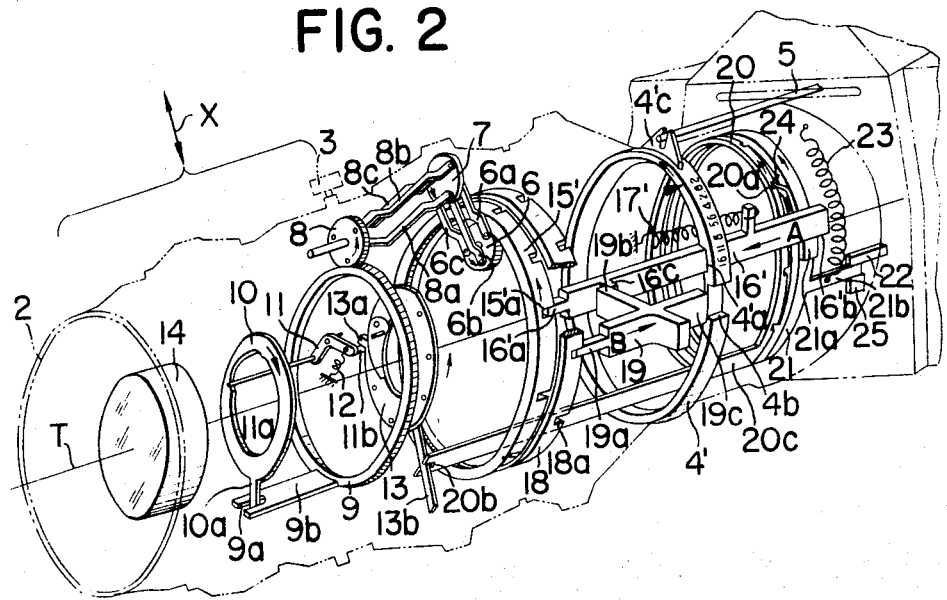
FIG. 2 is a perspective view of a second embodiment of the present invention of the type for planning in all directions and automatic aperture control.

Next the second embodiment of the present invention will be described with reference to FIG. 2. The second embodiment is of the type which allows panoramic photographing in all directions. In FIG. 2, the parts referred by the reference numerals 1 to 3 and 6 to 14 are similar to those shown in FIG. 1. An aperture ring 4' is fitted over the lens barrel 2 for rotation about the optical axis T and has a groove 4'a into which is fitted a slider 16', another groove 4'b into which is fitted a clutch member 19, and an engaging protrusion or claw 4'c for engagement with the actuating rod 5 which is actuated so as to vary the resistance of the exposure meter (not shown). Thus, the engaging claw 4'c and the actuating rod 5 constitute the exposure meter actuating mechanism so that the rotation of the aperture ring 4' may be interlocked with the exposure meter (not shown) for correction of exposure due to the change of the aperture value. An internal gear 15' incorporated in the lens barrel 2 for rotation about the optical axis T is provided with grooves 15'a formed in equiangularly spaced apart relation with each other.

The slider 16' is fitted in the grove 4'a of the aperture ring 4' for slidable movement in the direction of the optical axis T. A projection 16a extending from one end of the slider 16' is adapted to fit into one of the grooves 15'a of the internal gear 15' while the other end 16'b engages with an engaging member 21a of an interlocking ring 21. Another engaging member 16'c extends from one side surface of the slider 16' for engagement with the actuating member 19b of the clutch 19. The slider 16' is normally biased in the direction indicated by the arrow A by a spring 17'.

A rotary member 18 is adapted to rotate about the optical axis T in the lens barrel 2 and is provided with grooves 18a formed in equiangularly spaced apart relation with each other and equal in number with that of the internal gear 15'. The rotary member 18 is caused to rotate by the toothed wheel 6, the links 6a, 6b and 6c the idle disk 7, the links 8a, 8b and 8c, the toothed wheel 8, the interlocking toothed wheel 9, the aperture cam ring 10, the limit lever 11, the spring 12, the aperture control ring 13, the objection lens 14 and the internal gear 15'.

The clutch member 19 which is slidable in the direction of the optical axis is provided at its one end with a protrusion 19a adapted to fit into one of the grooves 18a of the rotary member 18 and an actuating element 19b extending from one side surface of the clutch member 19 is adapted to engage with the engaging member 16'c of the slider 16'. When the aperture ring 4' remains in wide opened position, sliding the clutch member 19 in the direction indicated by the arrow B releases the engagement of the projection 19a with the groove 18a while the other end 19c engages with the groove 4'b of the aperture ring 4' so that the aperture ring 4' is held in stationary position. Furthermore, when the actuating element 19b causes the slider 16' to slide in the right direction, the engagement of the projection 16'a with the groove 15'a is released. A diaphragm setting member 20 is disposed in the lens barrel 2 for rotation about the optical axis T and is provided with grooves 20a formed in the same equiangularly spaced-apart relation with that of the grooves formed in the internal gear 15' and with an actuating member 20c extending toward the objective lens and having a notch 20b formed at the leading end thereof. The connecting member 13b is adapted to slide within the notch 20b while retaining its engaging relationship therewith when the parallel movement section makes a panoramic photographing movement.

One end of a plate spring 24 is securely fixed to the interlocking ring 21 while the other end is adapted to engage with the groove 20a of the diaphragm setting member 20 so that the member 20 may be rotated in unison with the interlocking ring 21 while when the end of the plate spring 24 is released from the groove, only one of the members 20 or 21 may be rotated independently.

Next the mode of operation will be described. When it is desired to change the shifting direction, the aperture ring 4' is set to the full or wide opened position and then the clutch member 19 is caused to slide in the direction indicated by the arrow B so that the engagements between the clutch member 19 and the rotary member 18 and between the slider 16' and the internal gear 15' are released, thereby allowing rotation through a desired angle about the optical axis T of the toothed gear 6, causing rotation of the links 6a, 6b and 6c, the idle disk 7, the links 8a, 8b and 8c and the toothed wheel 8, the interlocking toothed wheel 9, the aperture cam ring 10, the limit lever 11, spring 12, the aperture control ring 13, objective lens 14, the internal gear 15' and the rotary member 18. On the other hand, the interlocking ring 21 is prevented from rotation because of the engagement of its engaging member 21a with the slider 16' and of the engagement of its engaging portion 21b with the engaging projection 25 attached to the stationary member so that the aperture diaphragm setting member 20 is caused to rotate through the engagement of the notch 20b at the leading end of the actuating member 20c with the connecting rod 31b as the arrow wheel 13 is rotated. By this rotation, the plate spring 24 is released from engagement with the groove 20a and is caused to rotate in unison with the parallel movement section, the rotation transmitting link mechanism, the internal gear 15' and the rotary member 18 through a desired angle of rotation. Thereafter, the plate spring 24 engages with another groove 20a. Then the clutch member 19 is caused to slide in the left direction so that the aperture ring 4' is released while the clutch member 19 engages with the rotary member 18 and the slider 16', with the internal gear 15'. Thus, the shifting is set.

Since the parallel movement section including the parts from the toothed wheel 8 to the photo lens 14 is so constructed as to move in the shifting direction, the shifting knob 3 may be rotated so as to move the parallel movement section, thereby setting it to the shifted photographing position.

Both the internal gear 15' and the interlocking toothed wheel 9 of the parallel movement section are interconnected with each other through the rotation transmitting link mechanism consisting of the toothed wheel 6, the links 6a, 6b and 6c the idle disk 7, the links 8a, 8b and 8c and the toothed wheel 8 so that the rotation of the internal gear 15' will be securely transmitted to the interlocking toothed wheel 9 in the same direction and in the same angle of rotation all the time wherever the interlocking wheel 9 may be positioned in its parallel movement.

When the aperture ring 4' is set to a desired aperture value, the exposure meter is adjusted accordingly through the engagement of the interlocking pawl 4'c with the actuating rod 5 while the control or limit lever 11 is rotated to be set to a predetermined position through the slider 16', the rotation transmitting link mechanism, the interlocking toothed wheel 9, and the cam ring 10. Thus, the engaging pin 11b is set to a predetermined position. Furthermore, the connecting member 13b of the aperture control ring 13 slides in the notch 20b of the operating member 20c of the diaphragm setting member 20 while retaining its engagement with the notch 20b. As the aperture ring 4' rotates, the slider 16' is caused to rotate in the direction indicated by the arrow so that the engaging face 16'b of the slider 16' is spaced apart from the engaging portion 21a of the interlocking ring 21 so as to allow setting of the diaphragm to a predetermined aperture. Therefore upon depressing the shutter release button (not shown), the interlocking ring 21 is caused to rotate in the direction indicated by the arrow by the spring 23 while the aperture control ring 13 rotates in the direction indicated by the arrow through the spring 24, the interlocking member 20, the engagement of its actuating member 20c with the connecting member 13b of the aperture control ring 13 so that as in the case of the first embodiment, engaging of the engaging member 13a with the engaging pin 11b stops the aperture control ring 13, whereby the diaphragm can be automatically set to a predetermined aperture value.

In the second embodiment described hereinabove, the connecting member 13b extending in the shifting direction is provided in the aperture control ring 13, but may be formed in the interlocking member 20. The arrangement of the connecting member 13b and the notch 20b may be of course be reversed. Furthermore, the aperture ring (having graduated scales) may be used as a part constituting said exposure actuating member. However, for example, the aperture ring may be replaced with an interlocking ring having no aperture scales while the aperture ring having graduated scales may be attached to the interlocking toothed wheel 9.

Figure 5:
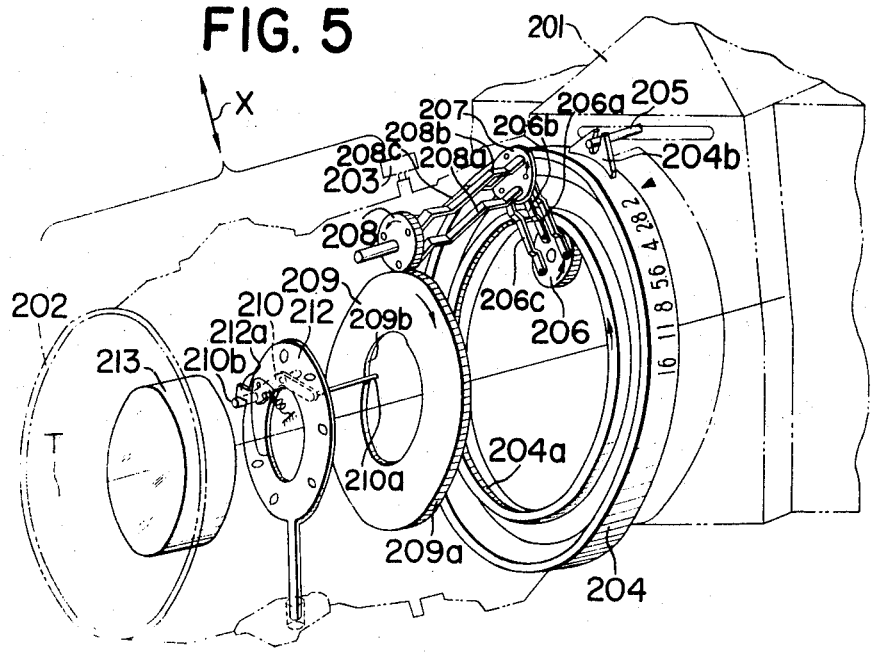
FIG. 5 is a perspective view of a third embodiment of the present invention of the type for shifting in one direction and manual aperture control.

Next the third embodiment of the present invention will be described with reference to FIG. 5. Reference numeral 201 denotes a camera main body; 202, a lens barrel; and 203, a shifting knob by rotation of which the section including the parts from a toothed wheel 208 to a objective lens 213 may be moved in the direction indicated by X in parallel with the film plane (not shown). An aperture ring 204 is attached the lens barrel 202 for rotation about the optical axis T and has internal teeth 204a and an actuating claw 204b for engagement with an actuating rod 205 for varying the resistance of an exposure meter (not shown). The claw 204b and the actuating rod 205 constitute an exposure actuating mechanism so that the aperture ring 204 may be interlocked with the exposure meter, thereby correcting the exposure in response to the aperture value variation. A toothed wheel 206 rotatably attached to the stationary member is in mesh with the internal teeth of gear 204a of the aperture ring 204 and rotatably carries links 206a, 206b and 206c. The other ends of these links are rotatably attached to one surface of an idle disk 207 in such a manner that they may transmit the rotation of the toothed wheel 206 to the idle disk 207 without interferring with each other. A toothed wheel 208 is rotatably attached to the parallel movement section including the parts from the aperture cam disk 209 to the objective lens 213 and is in mesh with the teeth 209a of the cam disk 209. The toothed wheel 208 carries rotatably one end of each of the links 208a, 208b and 208c while the other ends thereof are rotatably carried by the other surface of the idle disk 207 so that the rotation of the idle disk 207 may be transmitted to the toothed wheel 208 without interferring with each other. Thus, the toothed wheel 206, the links 206a, 206b and 206c, the idle disk 207, the links 208a, 208b and 208c and the toothed wheel 208 constitute the rotation transmitting link mechanism which can transmit the rotation of the aperture ring 204 to the aperture cam disk 209 even when the parallel movement section moves to a predetermined position.

The aperture cam disk 209 is attached to the lens barrel 202 for rotation about the optical axis T and has the teeth or gear 209a formed around the outer peripheral surface thereof. The cam surface 209b is formed around the inner peripheral surface thereof. A control or limit lever 210 has at its one end a connecting rod 210a or cam follower in engagement with the cam surface 209b and at its other end an engaging pin 210b for engagement with an aperture control ring 212 to be described in more detail hereinafter. The limit lever 210 has its intermediate portion rotatably attached to the stationary member of the parallel movement section and is normally biased by means of a spring 211 to rotate in the counterclockwise direction. Thus, the aperture cam disk 209 and the limit lever 210 constitute the aperture setting mechanism so that when the aperture ring 204 is set to a predetermined aperture value, the limit lever 210 is set to a predetermined position through said rotation transmitting link mechanism, thereby limiting the rotation of the aperture control ring 212 so as to set the diaphragm a predetermined aperture value.

The toothed wheel 208, the aperture cam disk 209, the limit lever 210, the spring 211, the aperture control ring 212 and the objective lens 213 are adapted to move in the predetermined direction (indicated by X) relative to the optical axis T in parallel relation with each other and with the film plane.

Thus, when the parallel movement section is displaced to any position in the predetermined direction (indicated by X), the toothed wheel 208 of the rotation transmitting link mechanism may be displaced in parallel with the toothed wheel 206. In this case, the direction and angle of rotation of the toothed wheel 206 are equal to those of the toothed wheel 208 to which is transmitted the rotation of the toothed wheel 206 so that the rotation of the aperture ring 204 is transmitted to the cam disk 209 in the same direction and the same angle of rotation. Thus, when the aperture ring 204 is set to a desired aperture value, the limit or control lever 210 is set to a predetermined position through the rotation transmitting link mechanism 206 to 208, the aperture cam disk 209 and the connecting rod 210a while the exposure is set through the engagement of the claw 204b with the actuating rod 205. Thereafter, the aperture control ring 212 is manually driven to the position limited by the control or limit lever 210 and then the shutter release button (not shown) is depressed.

Figure 6:
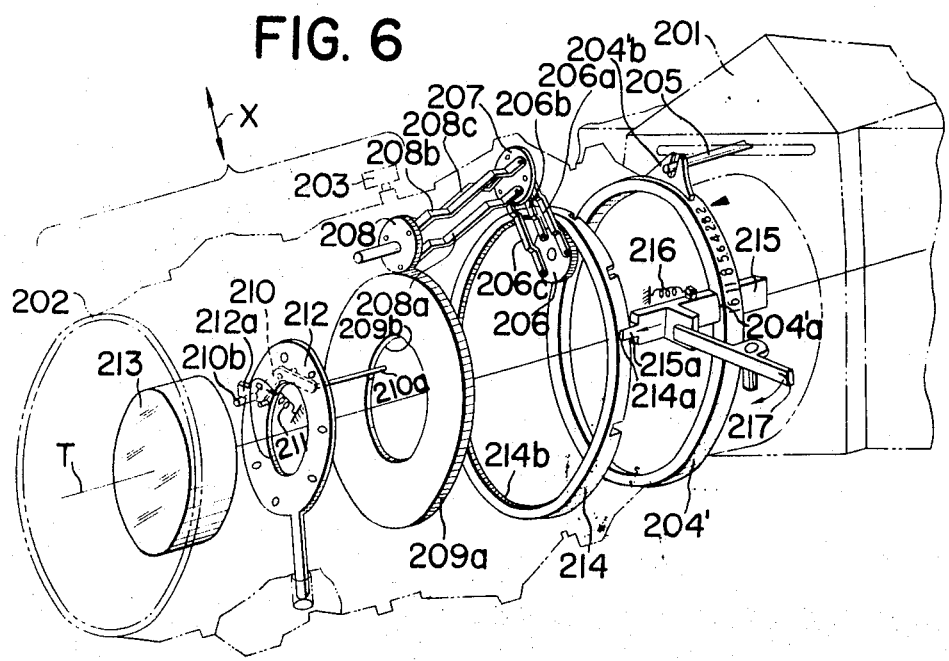
FIG. 6 is a perspective view of a fourth embodiment of the present invention of the type for shifting in all directions and manual aperture control.

Next the fourth embodiment of the present invention of the type which may be shifted in all directions will be described with reference to FIG. 6. The parts from 201 to 203 in FIG. 6 are arranged in the similar manner as described with reference to the third embodiment. An aperture ring 204' is attached to the lens barrel 202 for rotation about the optical axis T and has a claw 204'b for engagement with the actuating rod 205 for varying the resistance of the exposure meter (not shown) and a groove 204'a. The claw 204'b and the actuating rod 205 constitute the exposure meter actuating or interlocking mechanism so that the actuation of the aperture ring 204' may be interlocked with the exposure meter (not shown), thereby correcting the exposure in response to the change of the aperture value.

The parts from 206 to 213 are identical to those described in the third embodiment.

A rotary member 214 is attached to the lens barrel 202 for rotation about the optical axis T and has grooves 214a disposed in equianguraly spaced apart relation with each other. The rotary member 214 is further provided with the internal teeth 214b in mesh with the toothed wheel 206 and is adapted to rotate about the optical axis T together with parts from 206 to 213.

A slider 215 is fitted slidably into a groove 214a of the aperture ring 214 in the direction of the optical axis T. One end of the slider 215 has a projection 215a adapted to fit into one of the grooves 214a of the rotary member 214. The slider 215 is biased in the direction indicated by the arrow by a spring 216.

Release lever 217 has its center rotatably attached to the stationary member. When the release lever 217 is rotated in the direction indicated by the arrow, the slider 215 is caused to slide in the right direction so that the engagement of the projection 215a with the groove 214a is released. Thus, the slider 215 and the release lever 217 constitute clutch member.

The shifting direction may be arbitrarily determined by rotating the release lever 217 in the direction indicated by the arrow so as to slide the slider 215 toward the right, thereby releasing the engagement of the projection 215a with the groove 214a; rotating the parts from the toothed wheel 206 to the rotary ring 214 about the optical axis T through a desired angle; and engaging again the projection 215a with the groove 214a, thereby holding in position the parts from the toothed wheel 206 to the rotary ring 214. Furthermore, the panoramic photographing position may be determined by the knob 203 by displacing to a desired position in the predetermined direction (X direction) the parallel movement section including the parts from the toothed wheel 208 to the objective lens 213. The rotation of the aperture ring 204' may be transmitted in the same direction and through the same angle to the aperture cam disk 209 through the slider 215, the rotary member 214 and the rotation transmission link mechanism from 206 to 208 so that the exposure adjustment can be carried out in the similar manner as in the case of the third embodiment. In the embodiment described hereinabove, the aperture cam disk 209 and the control lever 210 constitute the aperture setting member. Furthermore, the aperture ring 204 (having graduated scales) or 204' may be used so as to constitute one part of the above described exposure actuating member. For example, the aperture ring may be replaced with an interlocking ring having no graduated scales and the aperture ring (having graduated scales) may be attached to the parallel movement section so as to be interlocked with the aperture cam disk 209.

What is claimed is:

1. In an automatic preset diaphragm camera having a camera body, a shutter control member, an exposure meter, and a shiftable objective lens system mounted in said body and including a lens, an aperture control ring, diaphragm means and an aperture cam all arranged to move in unison in a predetermined direction parallel to the film plane, an aperture setting ring, aperture setting means adapted to limit rotation of said aperture control ring, means interlocking said aperture setting ring and said aperture setting means whereby rotary movement of said aperture setting ring is transferred to said aperture control ring in all positions of said objective lens system throughout its shifting range, exposure meter actuating means interlocking said aperture setting ring with said exposure meter whereby rotation of said aperture setting ring also adjusts said exposure meter relative to the adjustment of said aperture control ring in all positions of said objective lens system throughout its shifting range, and aperture interlocking means associated with said aperture control ring for shifting same upon release of said shutter control member to its limit of rotation set by said aperture setting means.

2. An automatic preset diaphragm camera according to claim 1 wherein said means interlocking said aperture setting ring and said aperture setting means comprises a rotation transmitting link mechanism, said aperture setting means including a rotatable ring mounted against shifting movement in said camera body and means shiftable in said body, and a pin and slot connection between said rotatable ring and said shiftable means whereby rotary movement of said aperture setting ring is transmitted through said rotatable ring to said shiftable means in any position of same throughout its shifting range.

* * * * *